US007106884B2

(12) United States Patent
Tamaru (10) Patent No.: US 7,106,884 B2
(45) Date of Patent: Sep. 12, 2006

(54) DIGITAL WATERMARK EMBEDDING APPARATUS FOR DOCUMENT, DIGITAL WATERMARK EXTRACTION APPARATUS FOR DOCUMENT, AND THEIR CONTROL METHOD

(75) Inventor: Jun Tamaru, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 10/351,997

(22) Filed: Jan. 28, 2003

(65) Prior Publication Data

US 2003/0149936 A1 Aug. 7, 2003

(30) Foreign Application Priority Data

Feb. 1, 2002 (JP) ............................. 2002-025959

(51) Int. Cl.
*G06K 9/00* (2006.01)
(52) U.S. Cl. ....................................... 382/100; 713/176
(58) Field of Classification Search ................ 382/100, 382/232; 713/176; 348/460, 463
See application file for complete search history.

(56) References Cited

U.S. PATENT DOCUMENTS

| | | | | |
|---|---|---|---|---|
| 5,761,686 | A * | 6/1998 | Bloomberg | 715/529 |
| 5,765,176 | A * | 6/1998 | Bloomberg | 715/514 |
| 5,861,619 | A | 1/1999 | Horino et al. | 235/470 |
| 6,086,706 | A | 7/2000 | Brassil et al. | 156/277 |
| 6,731,774 | B1 * | 5/2004 | Hosaka et al. | 382/100 |
| 6,751,779 | B1 * | 6/2004 | Kurosawa et al. | 715/520 |
| 2003/0118211 | A1 * | 6/2003 | Eguchi et al. | 382/100 |
| 2004/0247155 | A1 * | 12/2004 | Eguchi | 382/100 |

FOREIGN PATENT DOCUMENTS

| | | |
|---|---|---|
| EP | 0 660 275 A2 | 12/1994 |
| JP | 9-186603 | 7/1997 |
| JP | 11-234502 | 8/1999 |
| JP | 3136061 | 12/2000 |

OTHER PUBLICATIONS

Nopporn Chotikakamthorn, "Electronic Document Data Hiding Technique using Inter-Character Space," The 1998 IEEE Asia-Pacific Conf. on Circuits and Systems, IEEE, 1998, pp. 419-422.

* cited by examiner

*Primary Examiner*—Jingge Wu
*Assistant Examiner*—Anand Bhatnagar
(74) *Attorney, Agent, or Firm*—Fitzpatrick, Cella, Harper & Scinto (57) ABSTRACT

This invention provides a digital watermark embedding apparatus for a document, which can eliminate unnaturalness that may be experienced upon laying out characters in a document when watermark information is embedded, while maintaining the robustness of a document itself and the information size to be embedded of a digital watermark. A document image is input from an image input unit (11), and watermark information is input from a watermark information input unit (15). A region division unit (12) divides the document image into regions, and a circumscribing rectangle extraction unit (13) sets circumscribing rectangles for characters and extracts them as character images. A punctuation mark determination unit (14) determines a punctuation mark from the character image. A watermark information embedding unit (16) embeds watermark information by digital watermarking that shifts character images other than the character image determined to be a punctuation mark.

24 Claims, 10 Drawing Sheets

DIGITAL WATERMARK EMBEDDING APPARATUS FOR DOCUMENT, DIGITAL WATERMARK EXTRACTION APPARATUS FOR DOCUMENT, AND THEIR CONTROL METHOD

FIELD OF THE INVENTION

The present invention relates to a digital watermark embedding apparatus and digital watermark extraction apparatus for a document, and their control method, which embed and extract watermark information in and from a document image by digital watermarking, so as to protect the copyrights and the like of document information.

BACKGROUND OF THE INVENTION

As a method of protecting copyrights upon distributing digital data such as image data, audio data, and the like on the Internet, digital watermarking is receiving a lot of attention. Digital watermarking is a technique for embedding watermark information in digital data such as image data, audio data, and the like so as not to be perceived by a person. For example, as digital watermarking techniques for multi-valued images, various methods that exploit the redundancy of the density of a multi-valued image are known.

On the other hand, a binary image such as a document image has less redundancy, and it is difficult for such image to implement digital watermarking. However, some digital watermarking methods that utilize unique features of document images are known. For example, a method of shifting the baseline of a row (Japanese Patent No. 3,136,061), a method of manipulating an inter-word space length (U.S. Pat. No. 6,086,706, Japanese Patent Laid-Open No. 9-186603 (to be referred to as "reference 1" hereinafter)), a method of manipulating an inter-character space length (King Mongkut University, "Electronic document data hiding technique using inter-character space", The 1998 IEEE Asia-Pacific Conf. On Circuits and Systems, 1998, pp. 419–422 (to be referred to as "reference 2" hereinafter), a method of handling a document image as a bitmap image expressed by black and white, two values (Japanese Patent Laid-Open No. 11-234502), and the like are known.

In the digital watermarking methods for a document described in references 1 and 2, the space length between neighboring words or characters is changed to express digital watermark information, and 1-bit information (1 or 0) is assigned in accordance with the size relationship of two space lengths.

Reference 1 specifies the use of an inter-word space length, and English and European documents as objects which are to undergo watermarking. However, by replacing the relationship between the space length and embedding information used in reference 1 by the relationship between the inter-character space length of a Japanese document and embedding information, the method of reference 1 can be applied to Japanese documents.

Reference 2 uses Thai in experiments, but does not particularly limit objects to which watermarking is to be applied. Hence, the method itself proposed by reference 2 can be applied to Japanese as in reference 1.

Figure 9:
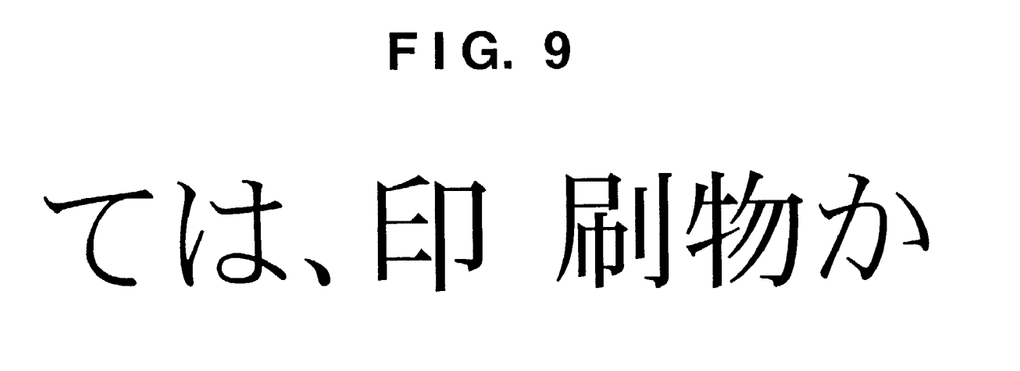
FIG. 9 shows the first application result example in which the conventional digital watermarking technique is applied to the text of a Japanese document.

However, with the aforementioned conventional digital watermarking method of embedding watermark information in a document by manipulating the inter-character space length, the balance among characters in a document becomes unnatural depending on positions in the document where watermark information is embedded. FIG. 9 shows the first application result example in which the conventional digital watermarking technique is applied to text of a Japanese document. As shown in FIG. 9, a character "印" after a punctuation mark is separated from the next character "刷" due to the presence of a space on the right side of the character "印", resulting in an unnatural balance of the document.

Figure 10:
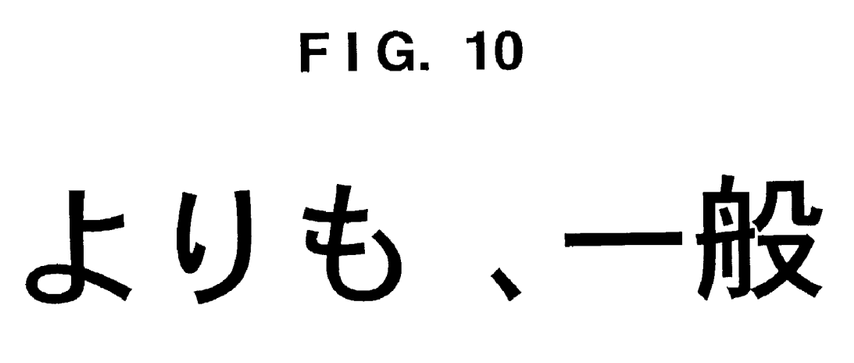
FIG. 10 shows the second application result example in which the conventional digital watermarking technique is applied to the text of a Japanese document.

FIG. 10 shows the second application result example in which the conventional digital watermarking technique is applied to text of a Japanese document. In this case, the position of a punctuation mark "、" is incorrect, resulting in an unnatural balance of the document. That is, since the space lengths before and after a character where watermark information has been embedded have a large difference, that portion readily looks unnatural.

SUMMARY OF THE INVENTION

The present invention has been made in consideration of the above situation. A punctuation mark will be exemplified as a typical position that becomes unnatural upon embedding a watermark, but the scope of this invention includes excluding other positions that may give unnatural impression upon embedding from objects to which a watermark is to be embedded. That is, it is an object of the present invention to provide a digital watermark embedding apparatus and digital watermark extraction apparatus for a document, and their control method, which can eliminate unnaturalness that may be experienced upon laying out characters in a document when watermark information is embedded, while maintaining the robustness of a document itself and the information size to be embedded of a digital watermark.

In order to achieve the above object, according to the present invention, there is provided a digital watermark embedding apparatus for a document, which comprises image input means for inputting a document image obtained by converting a document into digital data, character extraction means for extracting character images included in the document image, watermark information input means for inputting watermark information, and watermark information embedding means for embedding the watermark information by digital watermarking that exploits spaces between the extracted character images, further comprising determination means for determining sizes of the extracted character images, wherein the watermark information embedding means embeds the watermark information by digital watermarking by shifting positions of character images, which are determined to be larger than a predetermined size.

Also, according to the present invention, there is provided a digital watermark extraction apparatus for a document, which comprises image input means for inputting a document in which watermark information is embedded by digital watermarking as a digital document image, character extraction means for extracting character images included in the document image, and watermark information extraction means for extracting the embedded watermark information on the basis of spaces between the extracted character images, further comprising determination means for determining sizes of the extracted character images, wherein the watermark information extraction means extracts the watermark information on the basis of a space between a character image which is determined to be larger than a predetermined size, and a character image which neighbors that character image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

A digital watermark embedding apparatus for a document, which embeds watermark information in a document image, and a digital watermark extraction apparatus for a document, which extracts watermark information from a document image, according to an embodiment of the present invention will be described hereinafter with reference to the accompanying drawings. In this embodiment, watermark information is to be embedded in a Japanese document. Also, a character image with a predetermined size has a size of a normal character image, and a character image smaller than the predetermined size indicates a character image of a punctuation mark or the like.

Figure 1:
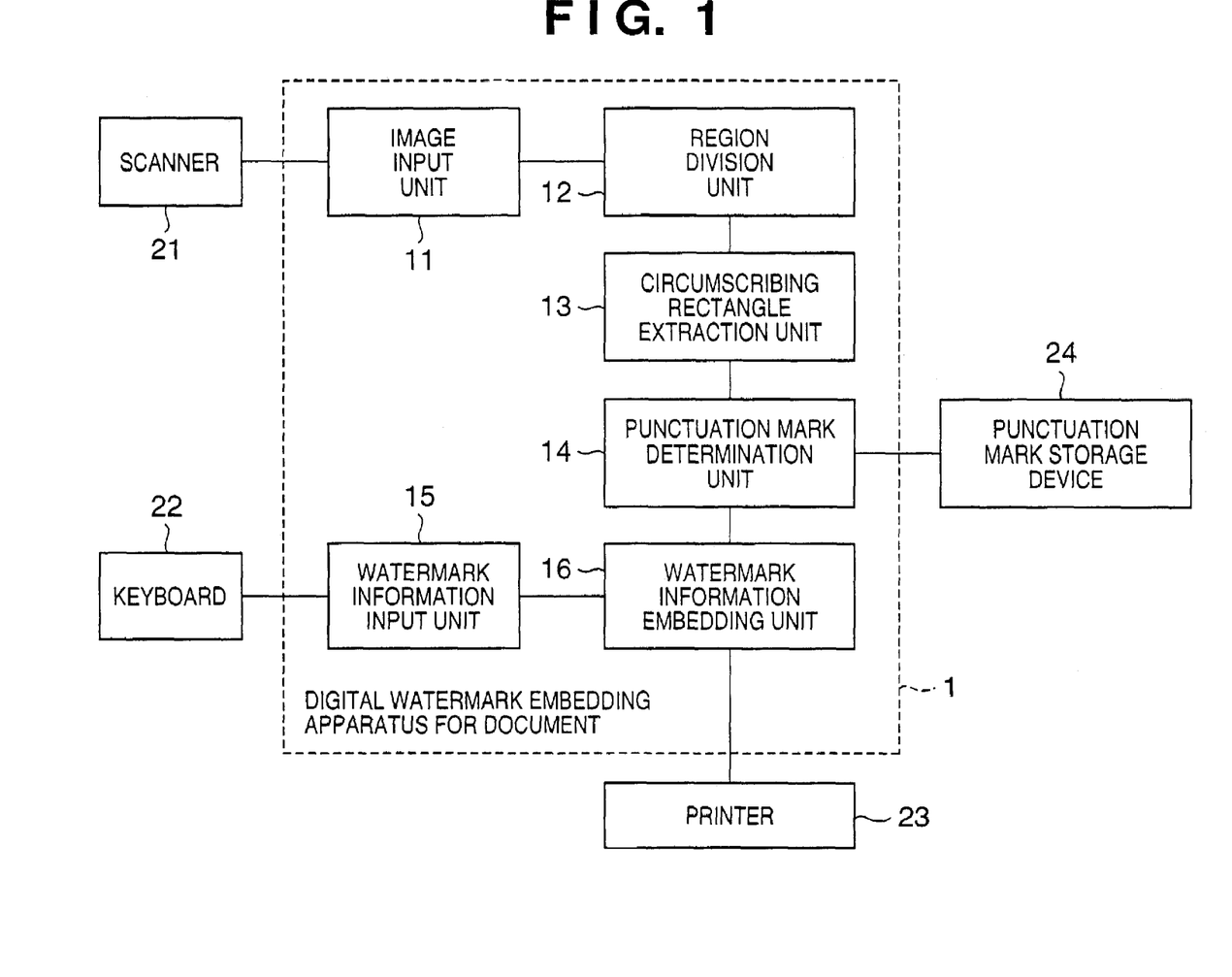
FIG. 1 is a block diagram showing the arrangement of a digital watermark embedding apparatus for a document according to an embodiment of the present invention that embeds watermark information in a Japanese document by digital watermarking.

FIG. 1 is a block diagram showing the arrangement of a digital watermark embedding apparatus for a document according to an embodiment of the present invention that embeds watermark information in a Japanese document by digital watermarking. Referring to FIG. 1, a scanner 21 for optically scanning a Japanese document printed on a given sheet surface and converting it into digital data, and a printer 23 for printing out the Japanese document in which watermark information is embedded are connected to a digital watermark embedding apparatus 1 for a document.

The detailed arrangement of the digital watermark embedding apparatus 1 for a document will be explained below. In the digital watermark embedding apparatus 1 for a document, an image input unit 11 is connected to the scanner 21, and inputs a digital document image which is scanned by the scanner 21. Note that the image input unit 21 may have a scanner function by itself, or may establish connection to a network or the like to receive data via the network. The image input unit 11 is connected to a region division unit 12.

The region division unit 12 divides the input document image into a plurality of regions having given attributes. For example, the attributes can be classified into text, graphics, graphs, tables, and the like. The region division unit 12 is connected to a circumscribing rectangle extraction unit 13. The circumscribing rectangle extraction unit 13 sets circumscribing quadrangles (rectangles) for respective characters in the region with a text attribute in the document image, so as to extract that region. The circumscribing rectangle extraction unit 13 is connected to a punctuation mark determination unit 14.

The punctuation mark determination unit 14 extracts a punctuation mark from the characters in the extracted circumscribing rectangles. The punctuation mark determination unit 14 is connected to a punctuation mark storage device 24 and watermark information embedding unit 16. The punctuation mark storage device 24 stores information that pertains to the extracted punctuation mark, and may be included as a punctuation mark storage unit in the digital watermark embedding apparatus 1 for a document.

On the other hand, a watermark information input unit 15 is connected to a keyboard 22 and the watermark information embedding unit 16, and inputs watermark information input from the keyboard 22 to the watermark information embedding unit 16. Note that the watermark information input unit 15 may include the keyboard 22 or may establish connection to a network or the like to receive data.

The watermark information embedding unit 16 embeds the input watermark information in characters in the input document image other than the punctuation marks. The watermark information embedding unit 16 is connected to the printer 23.

As a digital watermarking method, a method of embedding watermark information by manipulating an inter-character space length using a region division technique and character extraction technique as basic techniques of OCR is used. A practical relationship between the space length and embedding information may use the method of reference 1 or 2 mentioned above or other methods.

That is, a digital watermark embedding apparatus 1 for a document according to this embodiment is a digital watermark embedding apparatus 1 for a document which comprises an image input unit 11 for inputting a document image obtained by converting a document into digital data, a character extraction unit (which can be formed by a region division unit 12 and circumscribing rectangle extraction unit 13) for extracting character images included in the document image, and a watermark information embedding unit 16 for embedding watermark information by digital watermarking that exploits the space between neighboring extracted character images, characterized by further comprising a determination unit (punctuation mark determination unit 14) for determining the size of each extracted character image, and in that the watermark information embedding unit 16 embeds the watermark information by digital watermarking by shifting the positions of character images which are determined to be larger than a predetermined size.

The digital watermark embedding apparatus 1 for a document according to this embodiment is characterized in that the watermark information embedding unit 16 embeds the watermark information by digital watermarking that shifts the positions of character images except for a character image smaller than the predetermined size, and a character image located immediately after that character image.

Furthermore, the digital watermark embedding apparatus 1 for a document according to this embodiment is characterized in that the character extraction unit comprises a region division unit (region division unit 12) for extracting a text region in the input document image, and a character extraction unit (circumscribing rectangle extraction unit 13) for extracting regions inside circumscribing quadrangles set for character images in the text region as character regions.

Moreover, the digital watermark embedding apparatus 1 for a document according to this embodiment is characterized in that when the position of an upper side of a circumscribing quadrangle set for a given character image in the document image is lower than a position half the height of a circumscribing quadrangle set for the immediately preceding character image, and the height of a circumscribing quadrangle set for a given character image in the document image is equal to or lower than half the height of a circumscribing quadrangle set for the immediately preceding character image, the determination unit (punctuation mark determination unit 14) determines that the given character image is excluded from objects to be embedded with digital watermark information.

Figure 2:
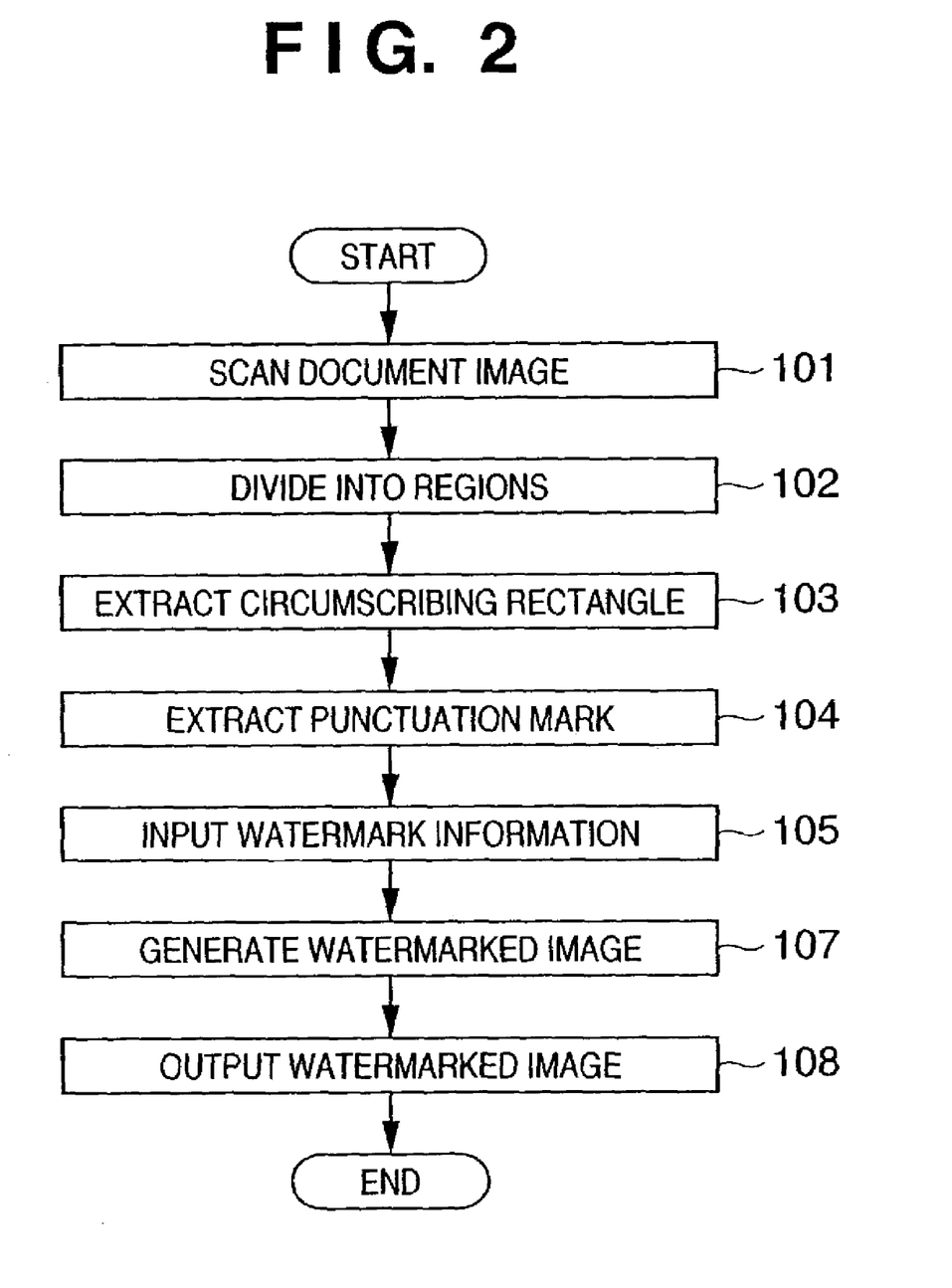
FIG. 2 is a flow chart for explaining the operation sequence of a digital watermark embedding apparatus 1 for a document according to the embodiment of the present invention.

The operation sequence of the digital watermark embedding apparatus 1 for a document with the above arrangement will be described below with reference to the accompanying drawings. FIG. 2 is a flow chart for explaining the operation sequence of the digital watermark embedding apparatus 1 for a document according to this embodiment.

The scanner 21 optically scans a document image in which watermark information is to be embedded, and converts it into digital data. The digital data is input to the region division unit 12 via the image input unit 11 (step S101). The region division unit 12 divides the input document image into a plurality of attribute regions such as a text region, graphic region, graph region, table region, and the like (step S102).

The circumscribing rectangle extraction unit 13 extracts circumscribing quadrangles (rectangles) of characters included in the text attribute region (step S103). The circumscribing rectangle of each character is a rectangle that circumscribes a character, and is originally information used to designate a region which is to undergo character recognition. However, in digital watermarking, the circumscribing rectangle indicates a character region which is to undergo embedding.

The punctuation mark determination unit 14 extracts a punctuation mark from the extracted circumscribing rectangle information of the characters, and stores the position of the punctuation mark in the punctuation mark storage device 24. The punctuation mark extraction sequence will be described in detail below. Upon extracting a punctuation mark, since an arbitrary character is always present before a punctuation mark irrespective of the text writing directions, a punctuation mark can be determined by comparing the positions and sizes of a circumscribing rectangle of a given character and that of a character immediately before the given character. A case of horizontal writing will be examined below.

Figure 3:
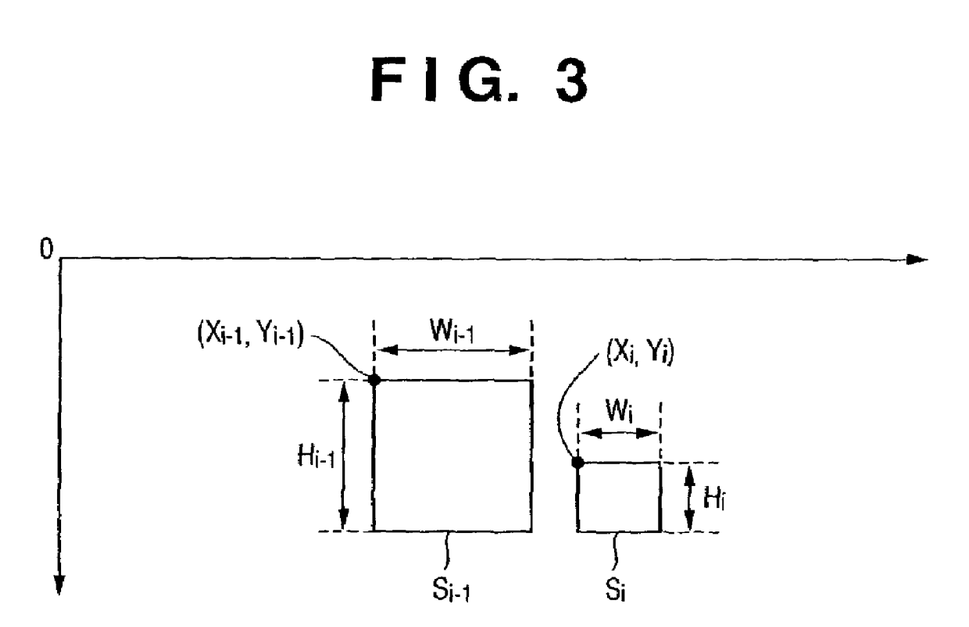
FIG. 3 shows an example of circumscribing rectangles used to explain an extraction method in punctuation mark determination.

FIG. 3 shows an example of circumscribing rectangles used to explain an extraction method in punctuation mark determination. As shown in FIG. 3, let $(X_i, Y_i)$ be the upper left coordinate position of a circumscribing rectangle $S_i$ of a character which is to undergo determination as to whether or not it is a punctuation mark, $W_i$ be the width of the circumscribing rectangle $S_i$, and $H_i$ be its height. Also, let $(X_{i-1}, Y_{i-1})$ be the upper left coordinate position of a circumscribing rectangle $S_{i-1}$ of a character before the circumscribing rectangle $S_i$, $W_{i-1}$ be the width of the circumscribing rectangle $S_{i-1}$, and $H_{i-1}$ be its height. Whether or not the character in the circumscribing rectangle $S_i$ in FIG. 3 is a punctuation mark can be determined by checking if the circumscribing rectangle $S_i$ satisfies:

$$H_i < H_{i-1}/2 \quad (1)$$

$$Y_i > Y_{i-1} + H_{i-1}/2 \quad (2)$$

That is, if these inequalities hold at the same time, the punctuation mark determination unit 14 determines that the character in that circumscribing rectangle is a punctuation mark.

Watermark information is input from the keyboard 22, and is input to the watermark information embedding unit 16 via the watermark information input unit 15 (step S105). The watermark information embedding unit 16 generates a watermarked image on the basis of the obtained circumscribing rectangle information, and the watermark information (step S106). At this time, information is not embedded in the punctuation mark itself and one character immediately before the punctuation mark so as not to shift that character, thereby removing unnaturalness of a document.

Figure 4:
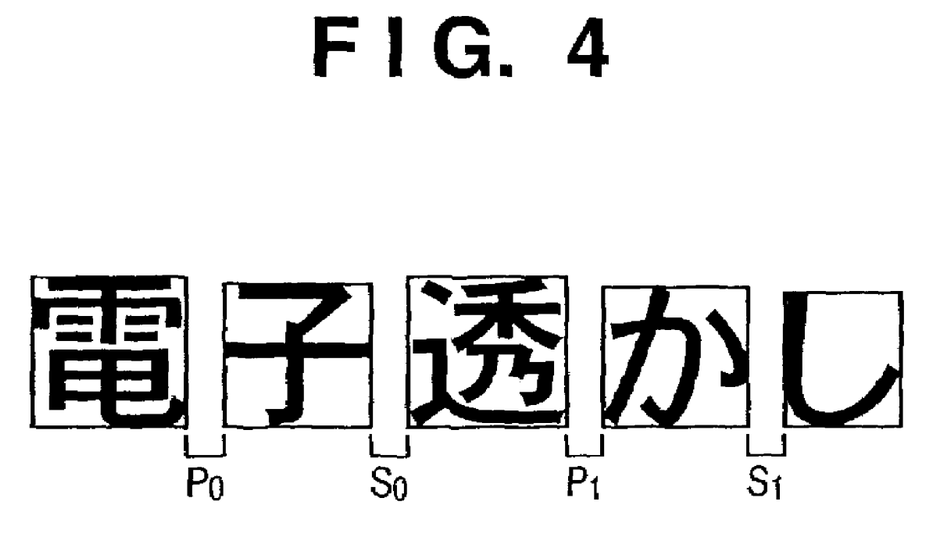
FIG. 4 shows a part of a document image before embedding of watermark information, which is input to the digital watermark embedding apparatus 1 for a document.
Figure 5:
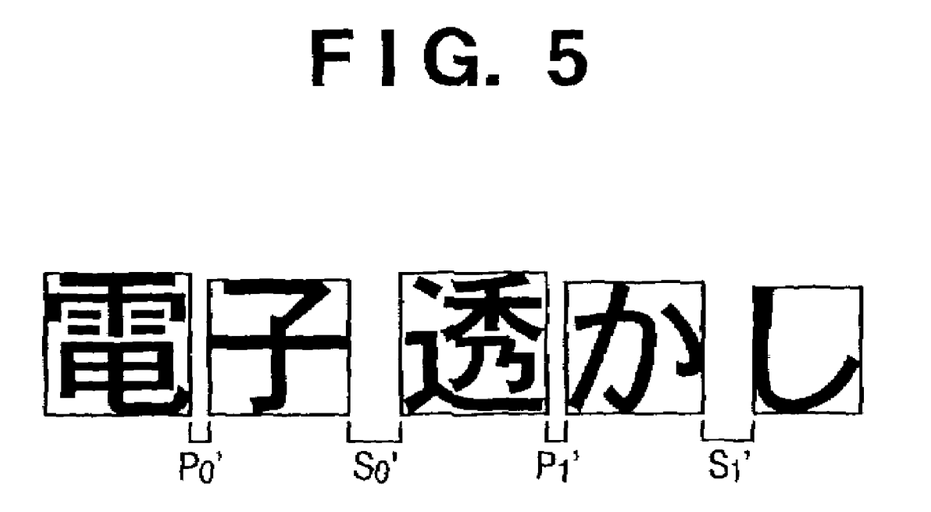
FIG. 5 shows a part of a document image after watermark information has been embedded in portions of the document image shown in FIG. 4.

The operation sequence of the watermark information embedding unit 16 will be described in detail below. FIG. 4 shows a part of a document image before embedding of watermark information, which is input to the digital watermark embedding apparatus 1 for a document. FIG. 5 shows a part of a document image after watermark information has been embedded in portions of the document image shown in FIG. 4. Space lengths $P_0$, $S_0$, $P_1$, and $S_1$ between neighboring circumscribing rectangles of characters shown in FIG. 4 change to space lengths $P_0'$, $S_0'$, $P_1'$, and $S_1'$ between neighboring circumscribing rectangles of characters shown in FIG. 5 after watermark information is embedded.

In FIGS. 4 and 5, there are five characters, and four spaces between neighboring characters. In this embodiment, since two space lengths are assigned to 1 bit, 2-bit information can be embedded using four spaces.

For example, if the sizes of two space length satisfy P>S, these spaces express 1; if they satisfy P<S, these spaces express 0. Thus, when a character "丁" between $P_0$ and $S_0$ in FIG. 4 is shifted to the left, and a character "ぁ" between $P_1$ and $S_1$ is shifted to the right, $P_0'<S_0'$ and $P_1'<S_1'$ in FIG. 5 as a part of the watermarked document image, i.e., a bit sequence "01" is embedded.

Watermark information is embedded based on the aforementioned embedding rules. An image embedded with the watermark information is printed out by the printer 23 (step S107). Note that the image embedded with the watermark information may be stored as image data in a storage device or the like or may be sent to another terminal or the like via a network or the like, in place of being printed.

Figure 6:
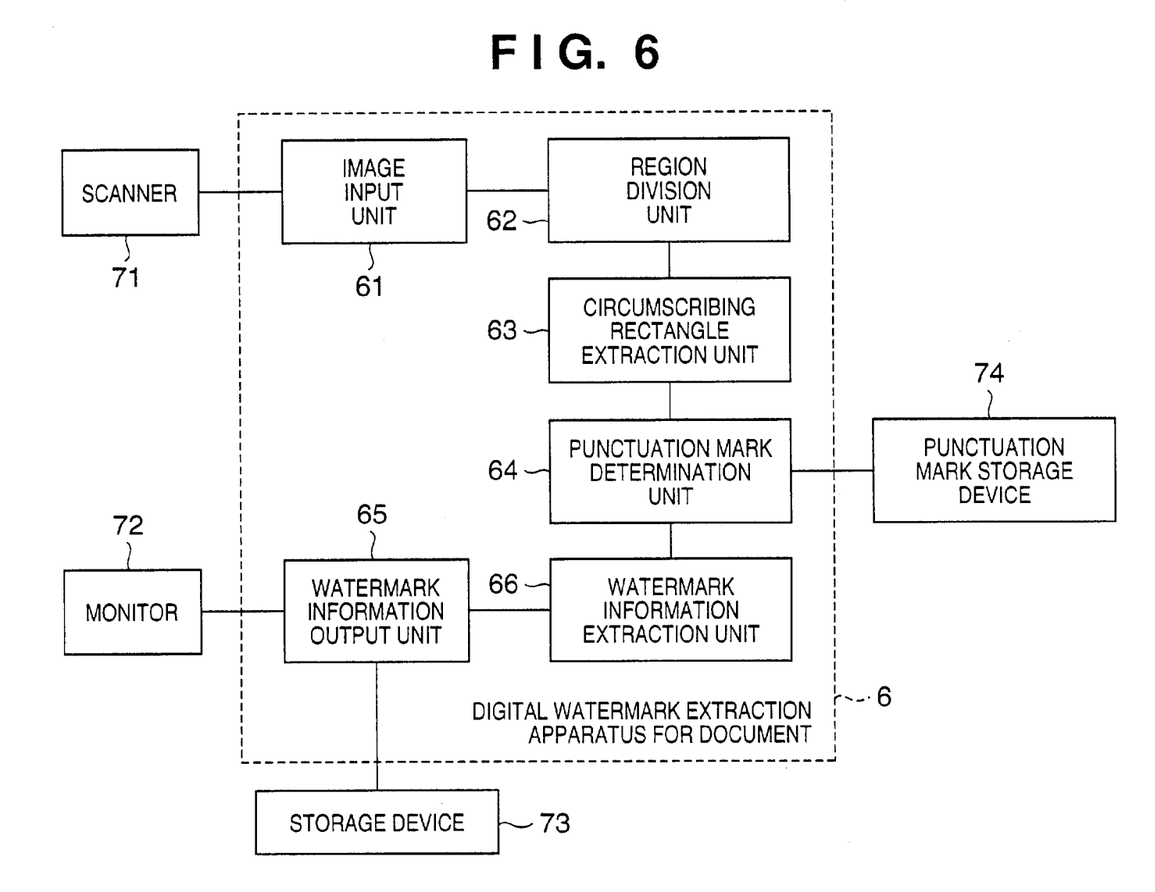
FIG. 6 is a block diagram showing the arrangement of a digital watermark extraction apparatus for a document according to an embodiment of the present invention that extracts watermark information embedded in a Japanese document.

An apparatus for extracting watermark information embedded in the aforementioned sequence from a document image, and its extraction sequence will be explained below. FIG. 6 is a block diagram showing the arrangement of a digital watermark extraction apparatus for a document according to an embodiment of the present invention that extracts watermark information embedded in a Japanese document. Referring to FIG. 6, a scanner 71 for optically scanning a Japanese document embedded with watermark information, and converting it into digital data, a monitor 72 for displaying extracted watermark information, and a storage device 73 for storing the watermark information are connected to a digital watermark extraction apparatus 6 for a document.

The detailed arrangement of the digital watermark extraction apparatus 6 for a document will be explained below. In the digital watermark extraction apparatus 6 for a document, an image input unit 61 is connected to the scanner 71, and inputs a document image optically scanned by the scanner 71. Note that the image input unit 61 may have a scanner function by itself, or may establish connection to a network or the like to receive data via the network. The image input unit 61 is connected to a region division unit 62.

The region division unit 62 has the same function as that of the aforementioned region division unit 12, and is connected to a circumscribing rectangle extraction unit 63. The circumscribing rectangle extraction unit 63 has the same function as that of the aforementioned circumscribing rectangle extraction unit 13, and is connected to a punctuation mark determination unit 64. The punctuation mark determination unit 64 has the same function as that of the aforementioned punctuation mark determination unit 14, and is connected to a punctuation mark storage device 74 and watermark information extraction unit 66. The punctuation mark storage device 74 stores information that pertains to the extracted punctuation mark, and may be included as a punctuation mark storage unit in the digital watermark extraction apparatus 6 for a document.

On the other hand, a watermark information output unit 65 is connected to the monitor 72, a storage device 73, and the watermark information extraction unit 66, and has a function of externally outputting the extracted watermark information. Note that the watermark information output unit 65 may include the monitor 72 and storage device 73, or may establish connection to a network or the like to output data.

That is, a digital watermark extraction apparatus 6 for a document according to this embodiment is characterized by comprising an image input unit 61 for inputting a document in which watermark information is embedded by digital watermarking as a digital document image, a character extraction unit (which can be formed by a region division unit 62 and circumscribing rectangle extraction unit 63) for extracting character images included in the document image, a watermark information extraction unit 66 for extracting the embedded watermark information on the basis of spaces between neighboring extracted character images, and a determination unit (punctuation mark determination unit 64) for determining the sizes of the extracted character images, and in that the watermark information extraction unit 66 extracts watermark information on the basis of the spaces between character images which are determined to be larger than a predetermined size.

The digital watermark extraction apparatus 6 for a document according to this embodiment is characterized in that the watermark information extraction unit 66 extracts the watermark information on the basis of spaces between character images except for a character image smaller than the predetermined size, and a character image located immediately after that character image.

Furthermore, the digital watermark extraction apparatus 6 for a document according to this embodiment is characterized in that the character extraction unit comprises a region division unit (region division unit 62) for extracting a text region in the input document image, and a character extraction unit (circumscribing rectangle extraction unit 63) for extracting regions inside circumscribing quadrangles set for character images in the text region as character regions.

Moreover, the digital watermark extraction apparatus 6 for a document according to this embodiment is characterized in that when the position of an upper side of a circumscribing quadrangle set for a given character image in the document image is lower than a position half the height of a circumscribing quadrangle set for the immediately preceding character image, and the height of a circumscribing quadrangle set for a given character image in the document image is equal to or lower than half the height of a circumscribing quadrangle set for the immediately preceding character image, the determination unit (punctuation mark determination unit 64) determines that the given character image is excluded from objects to be embedded with digital watermark information.

Figure 7:
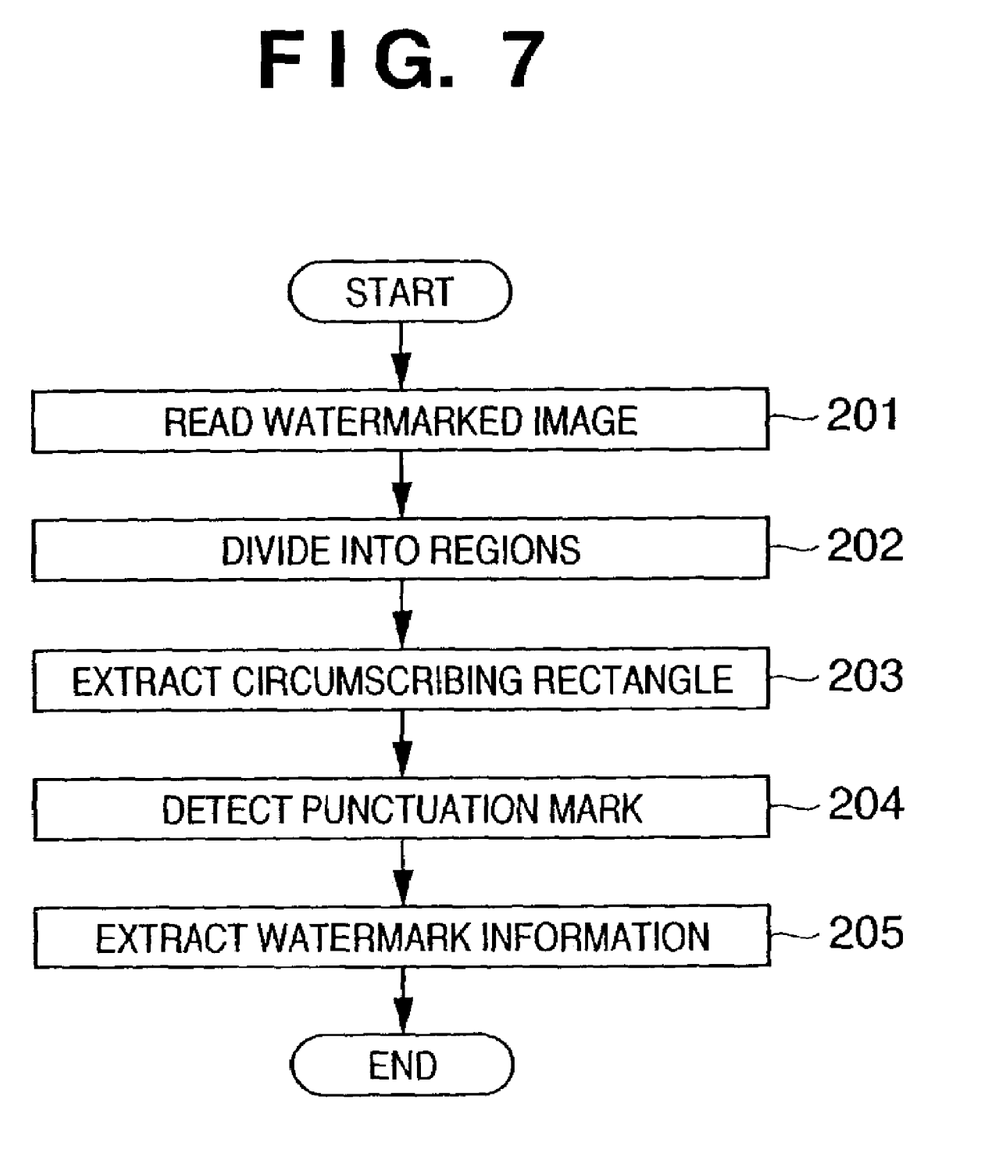
FIG. 7 is a flow chart for explaining the operation sequence of a digital watermark extraction apparatus 6 for a document according to the embodiment of the present invention.

The operation sequence of the digital watermark extraction apparatus 6 for a document with the above arrangement will be explained below with reference to the accompanying drawings. FIG. 7 is a flow chart for explaining the operation sequence of the digital watermark extraction apparatus 6 for a document according to this embodiment.

The scanner 71 optically scans a document image embedded with watermark information, and converts it into digital data. The digital data is input to the region division unit 62 via the image input unit 61 (step S201). The region division unit 62 divides the input document image into a plurality of attribute regions such as a text region, graphic region, graph region, table region, and the like (step S202).

The circumscribing rectangle extraction unit 63 extracts circumscribing quadrangles (rectangles) of characters included in the text attribute region (step S203). The punctuation mark determination unit 64 extracts a punctuation mark from the extracted circumscribing rectangle information of the characters, and stores the position of the punctuation mark in the punctuation mark storage device 74 (step S204). Note that the punctuation mark extraction sequence is the same as that upon embedding the watermark information.

Then, the watermark information extraction unit 65 extracts watermark information (step S205), and displays it on the monitor 72. Or the extracted watermark information is stored in the storage device 73. This extraction sequence can be implemented by obtaining an assigned bit by comparing the two space lengths between neighboring circumscribing rectangles of characters in the process in the aforementioned watermark information embedding sequence. In this case, a punctuation mark and a character after the punctuation mark are not used in decoding with reference to punctuation mark information.

As described above, positions which look unnatural if information is embedded there are detected in advance upon embedding, and are excluded from a watermark information embedding operation, thus eliminating unnaturalness of the whole document upon information embedding. When portions which may look unnatural upon information embedding can be similarly detected from both document images before and after watermarking, a bit sequence of watermark information can be normally extracted. As a result, unnaturalness can be eliminated without any drop of robustness by minimizing a decrease in information size (e.g., by omitting only bits which are to be embedded in portions that may look unnatural upon watermarking).

In the aforementioned embodiment, a character image smaller than a predetermined size indicates a character image of, e.g., a punctuation mark and the like. In the present invention, parentheses (e.g., [, ], (, ), and the like), half-size characters, various symbols (e.g., •, ", and the like) may also be excluded from objects which are to undergo digital watermarking. Also, other characters and symbols may be excluded from objects which are to undergo digital watermarking within the scope of the invention.

Figure 8:
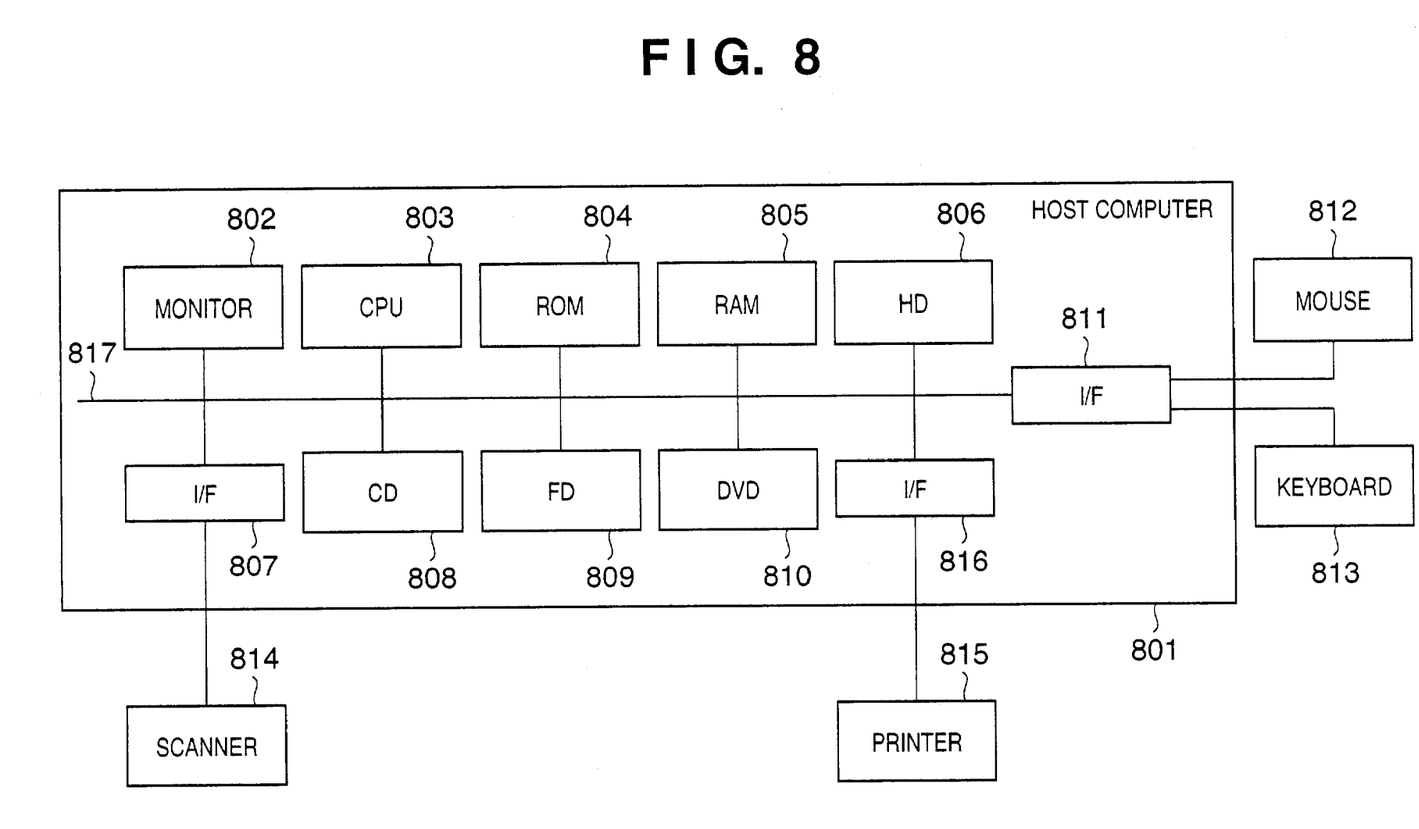
FIG. 8 is a block diagram for explaining the electrical arrangement of the digital watermark embedding apparatus 1 and digital watermark extraction apparatus 6 for a document according to the embodiment of the present invention.

The aforementioned digital watermarking method for a document can be implemented using a signal processing apparatus shown in FIG. 8. FIG. 8 is a block diagram for explaining the electrical arrangement of the digital watermark embedding apparatus 1 and digital watermark extraction apparatus 6 for a document according to this embodiment. Referring to FIG. 8, a host computer 801 can be implemented by a prevalent personal computer, and can input, edit, and save an image scanned by a scanner 814. Furthermore, the image obtained by the host computer 801 can be displayed on a monitor 802 or printed by a printer 815. Various user's manual instructions are issued based on inputs from a mouse 812 and keyboard 813.

In the host computer 801, respective blocks to be described later are connected via a bus 816 to be able to exchange various data with each other. In FIG. 8, a CPU 803 is a central processing unit which controls the operations of internal blocks, or can execute an internally stored program.

A ROM 804 is a storage device which stores a specific image which is inhibited from being printed, a required image processing program, and the like. A RAM 805 is a memory which temporarily stores a program and image data to be processed upon executing a process by the CPU 803.

A hard disk (HD) 806 is a storage device which can pre-store a program and image data to be transferred to the RAM 805 and the like, and can save processed image data. An I/F 807 is a scanner interface which connects the scanner 814 which optically scans a document, film, or the like using a CCD camera or the like, and generates image data, and can input image data obtained by the scanner 814.

A CD driver 808 can read out or write data from or in a CD (CD-R) as one of external storage media. An FD drive 809 can read out or write data from or in an FD as in the CD drive 808. A DVD drive 810 can read out or write data from or in a DVD as in the CD drive 808.

If the CD, FD, DVD, or the like stores an image edit program or printer driver, such programs are installed on the HD 806, and are transferred onto the RAM 805 as needed. An I/F 811 is an interface which connects the mouse 812 and keyboard 813 to accept input instructions from them. Likewise, an I/F 816 is an interface which connects the printer 815.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flow charts.

As described above, according to the present invention, unnaturalness that may be experienced upon laying out characters in a document when watermark information is embedded can be eliminated, while maintaining the robustness of a document itself and the information size to be embedded of a digital watermark.

The present invention is not limited to the above embodiments and various changes and modifications can be made within the spirit and scope of the present invention. Therefore, to apprise the public of the scope of the present invention, the following claims are made.

What is claimed is:

1. A digital watermark embedding apparatus for a document, which comprises image input means for inputting a document image obtained by converting a document into digital data, character extraction means for extracting character images included in the document image, watermark information input means for inputting watermark information, and watermark information embedding means for embedding the watermark information by digital watermarking that exploits spaces between the extracted character images, further comprising:
   determination means for determining sizes of the extracted character images,
   wherein said watermark information embedding means embeds the watermark information by digital watermarking by shifting positions of character images, which are determined to be larger than a predetermined size.

2. The apparatus according to claim 1, wherein said watermark information embedding means embeds the watermark information by digital watermarking that shifts positions of character images except for a character image smaller than the predetermined size, and a character image located immediately after that character image.

3. The apparatus according to claim 1, wherein said character extraction means comprises:
   a region division unit for extracting a text region in the input document image; and
   a character extraction unit for extracting regions inside circumscribing quadrangles set for the character images in the text region as character regions.

4. The apparatus according to claim 1, wherein said determination means uses a size of a character which neighbors a character of interest upon determining the sizes of the character images.

5. The apparatus according to claim 3, wherein when a position of an upper side of a circumscribing quadrangle which is set for a given character image in the document image is lower than a position half a height of a circumscribing quadrangle which is set for a character image immediately before the given character image, and when a height of a circumscribing quadrangle which is set for a given character image in the document image is not more than a height of a circumscribing quadrangle which is set for a character image immediately before the given character image, said determination means determines that the given character image is to be excluded from objects to be embedded with digital watermark information.

6. A digital watermark extraction apparatus for a document, which comprises image input means for inputting a document in which watermark information is embedded by digital watermarking as a digital document image, character extraction means for extracting character images included in the document image, and watermark information extraction means for extracting the embedded watermark information on the basis of spaces between the extracted character images, further comprising:

determination means for determining sizes of the extracted character images, wherein said watermark information extraction means extracts the watermark information on the basis of a space between a character image which is determined to be larger than a predetermined size, and a character image which neighbors that character image.

7. The apparatus according to claim 6, wherein said watermark information extraction means extracts the watermark information on the basis of spaces between neighboring character images excluding the character image smaller than the predetermined size, and a character image which is located immediately after that character image.

8. The apparatus according to claim 6, wherein said character extraction means comprises:

a region division unit for extracting a text region in the input document image; and a character extraction unit for extracting regions inside circumscribing quadrangles set for the character images in the text region as character regions.

9. The apparatus according to claim 6, wherein said determination means uses a size of a character which neighbors a character of interest upon determining the sizes of the character images.

10. The apparatus according to claim 8, wherein when a position of an upper side of a circumscribing quadrangle which is set for a given character image in the document image is lower than a position half a height of a circumscribing quadrangle which is set for a character image immediately before the given character image, and when a height of a circumscribing quadrangle which is set for a given character image in the document image is not more than a height of a circumscribing quadrangle which is set for a character image immediately before the given character image, said determination means determines that the given character image is to be excluded from objects to be embedded with digital watermark information.

11. A method of controlling a digital watermark embedding apparatus for a document, which embeds predetermined watermark information in a document image obtained by inputting a document as a digital image, by digital watermarking that exploits spaces between character images, comprising:

the character extraction step of extracting character images included in the input document image;

the determination step of determining sizes of the extracted character images; and the watermark information embedding step of embedding the predetermined watermark information by digital watermarking by shifting positions of character images except for a character image, which is determined to be smaller than a predetermined size.

12. The method according to claim 11, wherein the watermark information embedding step includes the step of embedding the watermark information by digital watermarking that shifts positions of character images except for a character image smaller than the predetermined size, and a character image located immediately after that character image.

13. The method according to claim 11, wherein the character extraction step comprises:

the region division step of extracting a text region in the input document image; and the character extraction step of extracting regions inside circumscribing quadrangles set for the character images in the text region as character regions.

14. The method according to claim 11, wherein the determination step uses a size of a character which neighbors a character of interest upon determining the sizes of the character images.

15. The method according to claim 13, wherein when a position of an upper side of a circumscribing quadrangle which is set for a given character image in the document image is lower than a position half a height of a circumscribing quadrangle which is set for a character image immediately before the given character image, and when a height of a circumscribing quadrangle which is set for a given character image in the document image is not more than a height of a circumscribing quadrangle which is set for a character image immediately before the given character image, it is determined in the determination step that the given character image is excluded from objects to be embedded with digital watermark information.

16. A method of controlling a digital watermark extraction apparatus for a document, which extracts predetermined watermark information from a document image embedded with the predetermined watermark information, comprising:

the character extraction step of extracting character images included in the input document image;

the determination step of determining sizes of the extracted character images; and the watermark information extraction step of extracting the predetermined watermark information on the basis of a space between a character image which is determined to be larger than a predetermined size, and a character image which neighbors that character image.

17. The method according to claim 16, wherein the watermark information extraction step includes the step of extracting the watermark information on the basis of spaces between neighboring character images except for a character image which is located immediately after a character image which is determined to be smaller than the predetermined size.

18. The method according to claim 16, wherein the character extraction step comprises:

the region division step of extracting a text region in the input document image; and the character extraction step of extracting regions inside circumscribing quadrangles set for the character images in the text region as character regions.

19. The method according to claim 16, wherein the determination step uses a size of a character which neighbors a character of interest upon determining the sizes of the character images.

20. The method according to claim 18, wherein when a position of an upper side of a circumscribing quadrangle which is set for a given character image in the document image is lower than a position half a height of a circumscribing quadrangle which is set for a character image immediately before the given character image, and when a height of a circumscribing quadrangle which is set for a given character image in the document image is not more than a height of a circumscribing quadrangle which is set for a character image immediately before the given character image, it is determined in the determination step that the given character image is to be excluded from objects to be embedded with digital watermark information.

21. A computer program embodied in a computer readable medium for performing the steps of controlling a digital watermark embedding apparatus for a document, which embeds predetermined watermark information in a document image obtained by inputting a document as a digital image, by digital watermarking that exploits spaces between character images, comprising:

a program code of the character extraction step of extracting character images included in the input document image;

a program code of the determination step of determining sizes of the extracted character images; and a program code of the watermark information embedding step of embedding the predetermined watermark information by digital watermarking by shifting positions of character images which are determined to be larger than a predetermined size.

22. A computer readable recording medium storing a computer program for performing the steps of claim 21.

23. A computer program embodied in a computer readable medium for performing the steps of controlling a digital watermark extraction apparatus for a document, which extracts predetermined watermark information from a document image embedded with the predetermined watermark information, comprising:

a program code of the character extraction step of extracting character images included in the input document image;

a program code of the determination step of determining sizes of the extracted character images; and a program code of the watermark information extraction step of extracting the predetermined watermark information on the basis of spaces between neighboring character images except for a character image which is determined to be smaller than a predetermined size.

24. A computer readable recording medium storing a computer program for performing the steps of claim 23.

* * * * *